(12) United States Patent
Martin et al.

(10) Patent No.: US 9,403,523 B2
(45) Date of Patent: Aug. 2, 2016

(54) METHODS AND SYSTEMS FOR ADJUSTING HYBRID VEHICLE EFFICIENCY

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/459,127

(22) Filed: Aug. 13, 2014

(65) Prior Publication Data

US 2016/0046276 A1    Feb. 18, 2016

(51) Int. Cl.
*B60W 10/06*    (2006.01)
*B60W 10/08*    (2006.01)

(52) U.S. Cl.
CPC .............. *B60W 10/06* (2013.01); *B60W 10/08* (2013.01); *B60W 2510/0638* (2013.01); *B60W 2710/0644* (2013.01); *B60W 2710/081* (2013.01); *Y10S 903/93* (2013.01)

(58) Field of Classification Search
CPC ............ F02D 41/2432; F02D 41/2438; F02D 2200/1006; Y10S 903/93; B60W 10/06; B60W 10/08; B60W 20/00; B60W 2510/0638; B60W 2710/0644; B60W 2710/081
See application file for complete search history.

(56) References Cited

U.S. PATENT DOCUMENTS

| | | | |
|---|---|---|---|
| 4,676,215 A | 6/1987 | Blocher et al. | |
| 5,789,881 A | 8/1998 | Egami et al. | |
| 5,875,864 A | 3/1999 | Yano et al. | |
| 6,335,610 B1 | 1/2002 | Winstead | |
| 6,694,806 B2 | 2/2004 | Kumagai et al. | |
| 6,845,305 B1 | 1/2005 | Raftari et al. | |
| 7,020,547 B2 | 3/2006 | Ogaki | |
| 7,286,927 B2 | 10/2007 | DeCarlo et al. | |
| 7,967,720 B2 | 6/2011 | Martin et al. | |
| 8,560,155 B2 | 10/2013 | Kedar-Dongarkar et al. | |
| 2002/0055815 A1 | 5/2002 | Ju | |
| 2005/0228553 A1* | 10/2005 | Tryon | B60K 6/46 701/22 |
| 2008/0264398 A1 | 10/2008 | Schondorf et al. | |
| 2010/0070237 A1 | 3/2010 | Yitbarek et al. | |
| 2011/0054744 A1* | 3/2011 | Brennan | F02D 35/023 701/51 |
| 2012/0116626 A1 | 5/2012 | Perkins et al. | |
| 2013/0041533 A1* | 2/2013 | Kim | B60K 6/365 701/22 |
| 2013/0096759 A1 | 4/2013 | Breton et al. | |
| 2013/0184966 A1 | 7/2013 | Lockwood et al. | |
| 2014/0379206 A1* | 12/2014 | Martin | G01M 15/02 701/32.8 |

FOREIGN PATENT DOCUMENTS

WO    2010047944 A2    4/2010

* cited by examiner

*Primary Examiner* — Thomas Tarcza
*Assistant Examiner* — Edward J Pipala
(74) *Attorney, Agent, or Firm* — David Kelley; Alleman Hall McCoy Russell & Tuttle LLP

(57) ABSTRACT

Systems and methods for dynamically updating engine mechanical losses, driveline electrical losses, and a desired driveline speed are disclosed. In one example, the desired driveline speed may be adjusted based on efficiency of operating a driveline at a most efficient speed of three different driveline speeds. The system and method may allow a driveline to operate more efficiently as the driveline ages.

20 Claims, 7 Drawing Sheets

METHODS AND SYSTEMS FOR ADJUSTING HYBRID VEHICLE EFFICIENCY

FIELD

The present description relates to a system and method for determining desired operation conditions for a hybrid driveline. The methods and systems may be useful for a variety of hybrid drivelines including series and parallel configurations.

BACKGROUND AND SUMMARY

A hybrid vehicle's driveline may include an engine, a motor, and a generator. The engine, motor, and generator may be operated at conditions that are based on functions or tables stored in memory and vehicle operating conditions. The functions or tables may include empirically determined desired operating conditions that provide desired fuel economy, performance, and emissions. However, driveline components may age and not perform as expected when operated based on the functions or tables stored in memory. For example, engine friction may decrease over time. Further, electric motor friction may vary over time. If the engine, motor, and generator are operated at conditions based on static parameters stored in memory, powertrain efficiency may degrade.

The inventors herein have recognized the above-mentioned disadvantages and have developed a method, comprising: comparing engine efficiency at a present engine speed to engine efficiency at adjacent high and low engine speed values over a domain of a first function to find a maximum driveline efficiency based on driveline electrical losses and mechanical losses; and adjusting engine and motor speed settings responsive to the comparison.

By updating desired engine and motor speeds in response to driveline efficiency estimates based on engine losses and electrical machine losses, it may be possible to operate a hybrid driveline more efficiently over a hybrid vehicle's life cycle. For example, a vehicle may be initially programmed to operate with an engine speed of 1200 RPM when desired wheel torque is 50 NM. However, as the driveline, including the engine and motor age, it may be more efficient to operate the engine at 1225 RPM for the requested wheel torque. The change in desired engine speed may be attributed to engine deposit formation (e.g., carbon), manufacturing variation, fuel type, and other operating condition variations.

The present description may provide several advantages. Specifically, the approach may improve vehicle efficiency over a vehicle's life cycle. Further, the approach may be implemented in a way that reduces the possibility of disturbing a driver while control parameters are being updated. Further still, the approach allows for updating both engine and electric machine losses.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
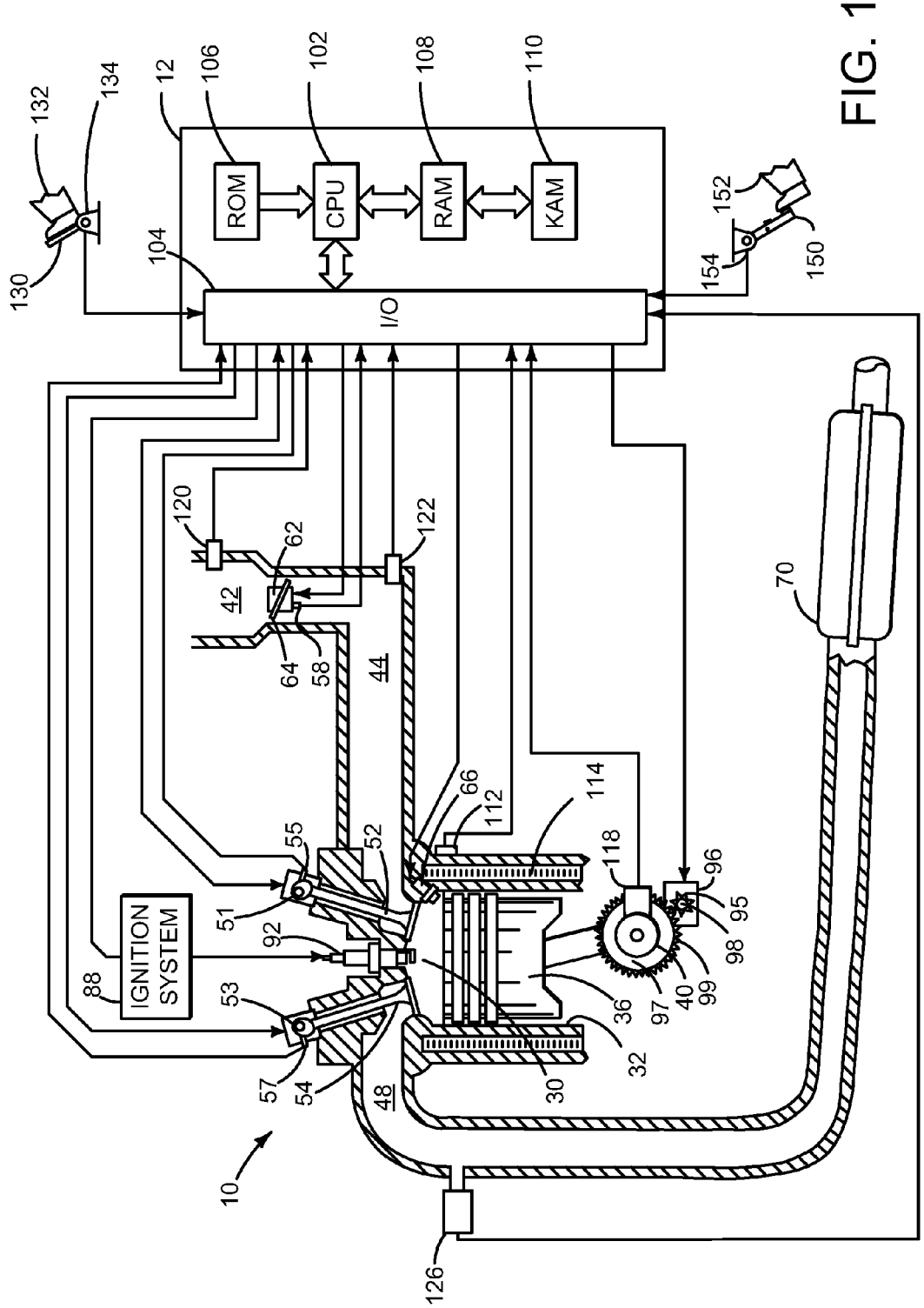
FIG. 1 is a schematic diagram of an engine.
Figure 2:
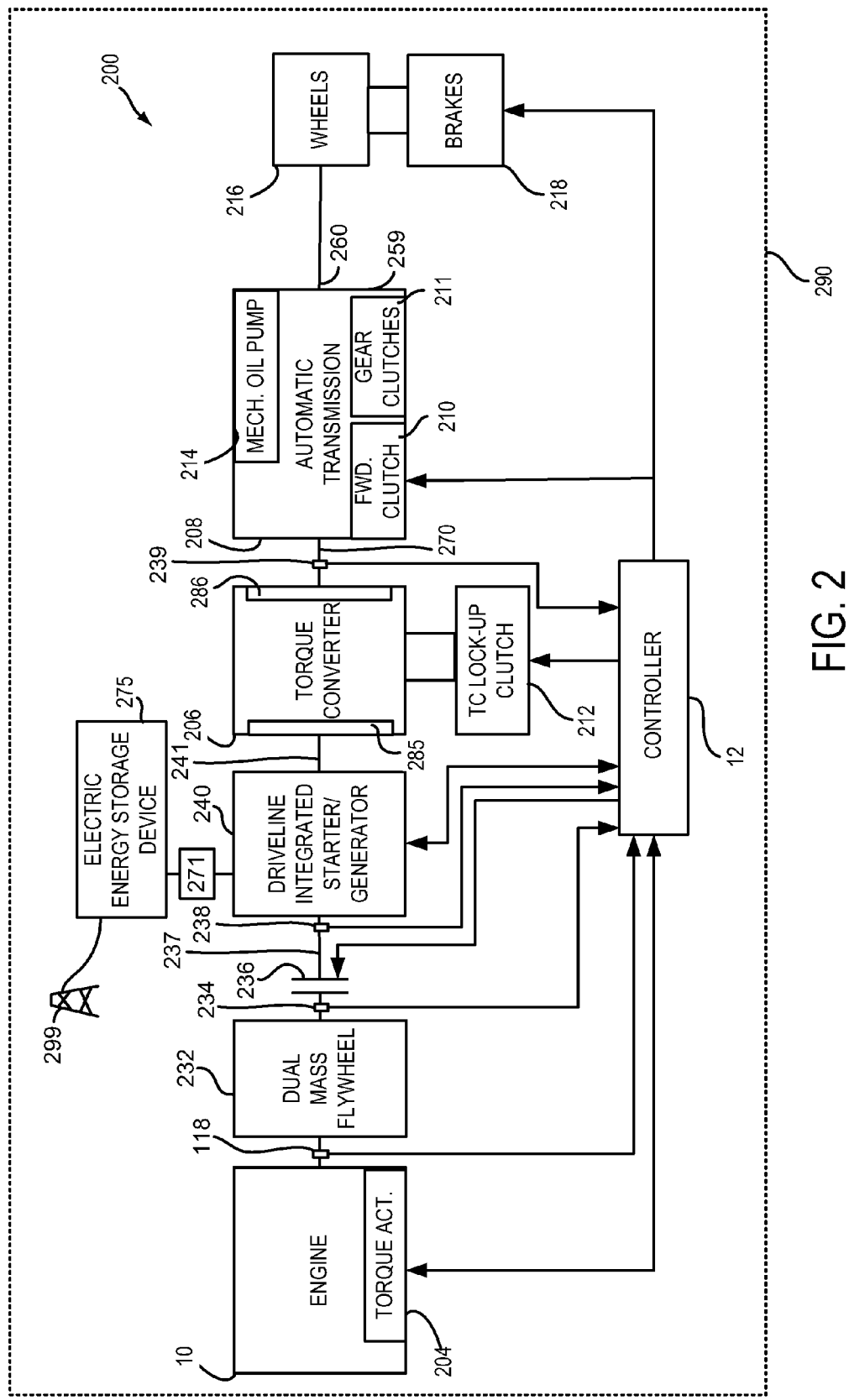
FIG. 2 shows a first example vehicle driveline configuration.
Figure 3:
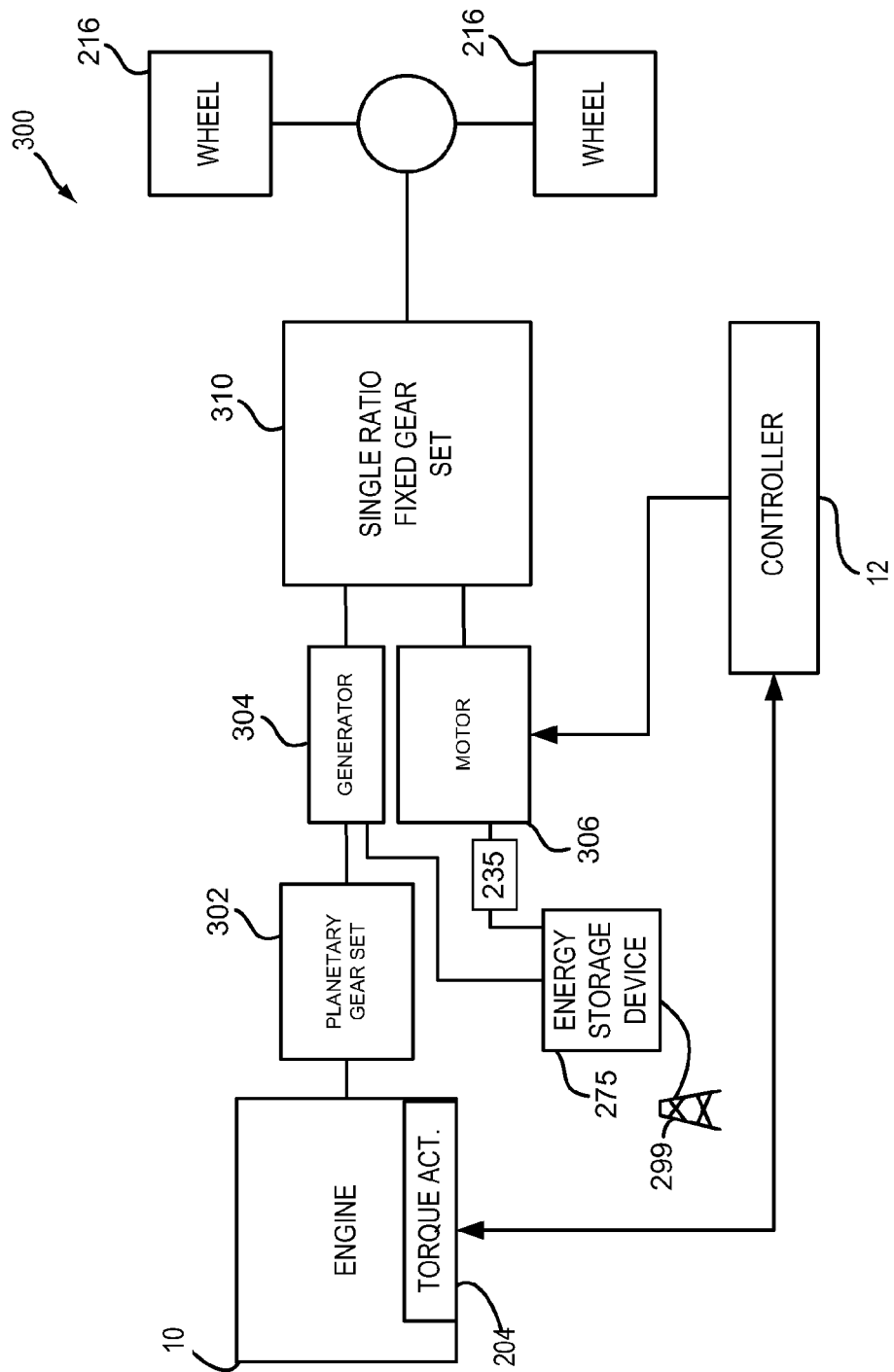
FIG. 3 shows a second example vehicle driveline configuration.
Figure 4:
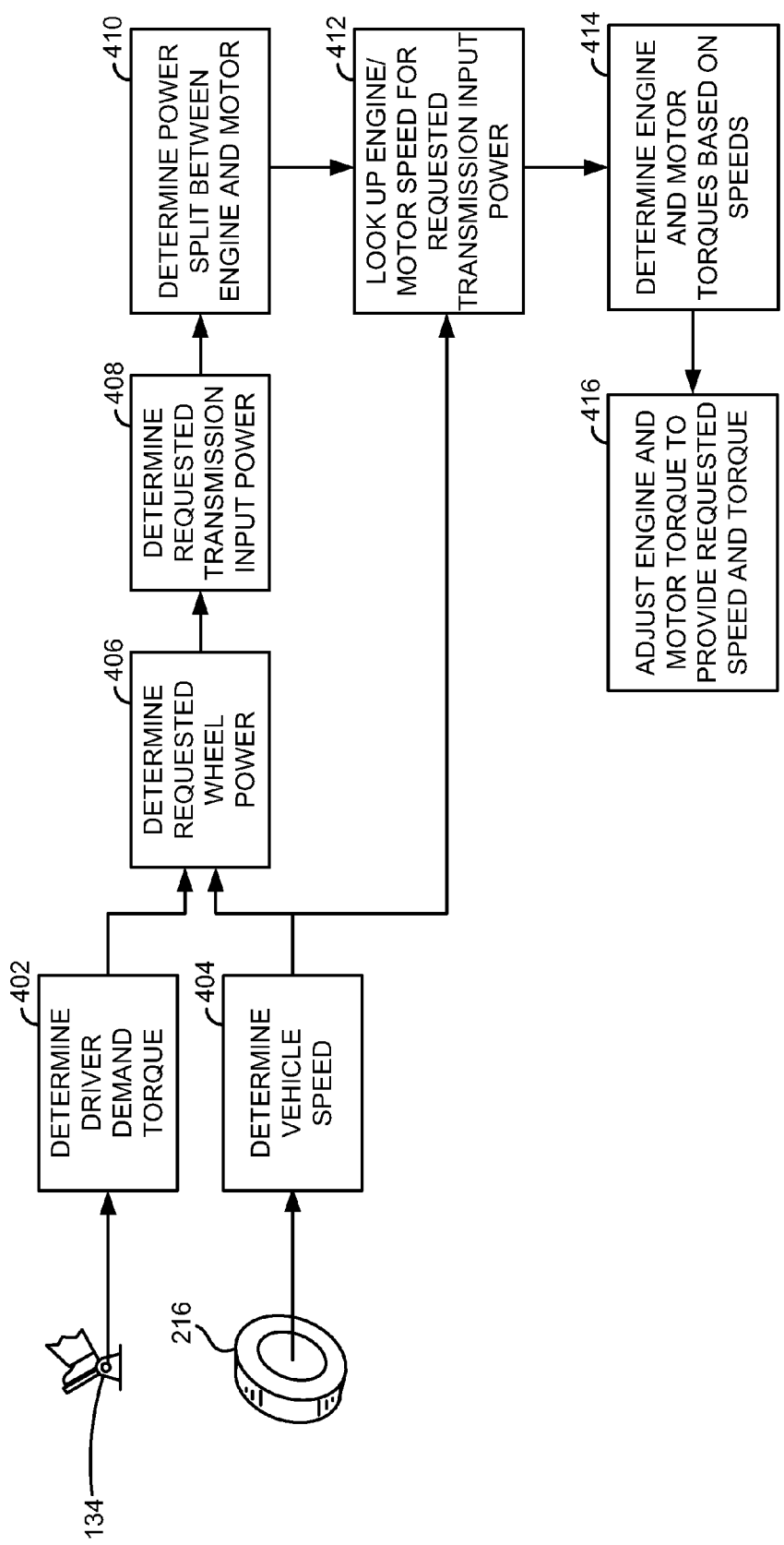
FIG. 4 shows a block diagram for determining desired engine and motor/generator operating conditions.

The present description is related to revising desired operating conditions for an engine and motor/generator of a hybrid vehicle driveline. The hybrid vehicle driveline may include an engine as shown in FIG. 1 that may be selectively coupled to a motor/generator to provide input to a transmission as is shown in FIG. 2. Alternatively, the engine of FIG. 1 may be included in a power split hybrid driveline with a motor and a generator as is shown in FIG. 3. Requested input from a driver may be processed as is shown in FIG. 4 to determine desired engine and motor/generator operating conditions. Engine and motor/generator operating speeds for a plurality of vehicle power output levels may be revised according to the method of FIGS. 5A-5C as a vehicle ages to maintain and/or improve hybrid driveline efficiency.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transient) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. Voltage controller 271 may boost voltage of energy storage device 275 to operate DISG 240. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor, and the electrical energy storage device 275 may be selectively coupled to a stationary electrical power grid 299 to recharge the electrical energy storage device 275. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Referring now to FIG. 3, an example of an alternative driveline 300 is shown. Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 275 and motor 306. Electrical energy storage device 275 may supply electrical power to motor 306 via variable voltage controller 271 when engine 10 is not operating. Electrical energy storage device may be a battery, capacitor, or other electrical energy storage device, and electrical energy storage device 275 may be selectively electrically coupled to stationary power grid 299. Motor 306 may also be operated in a generator mode for regenerative braking Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple fixed gear ratios for delivering engine and motor power to vehicle wheels.

Thus, the systems of FIGS. 1-3 provide for a vehicle system, comprising: an engine; a motor/generator in mechanical communication with the engine; and a controller including non-transitory instructions executable to rotate the engine via the motor/generator in response to a request to update engine mechanical losses and a vehicle in which the motor/generator operates being electrically coupled to a stationary power grid. The vehicle system further comprises additional instructions to update the engine mechanical losses in response to the vehicle decelerating.

In some examples, the vehicle system includes where the engine mechanical losses include friction and pumping losses, and further instructions to update driveline electrical losses. The vehicle system further comprises additional instructions to update motor losses stored in memory in response to a request to update driveline electrical losses stored in memory and the vehicle being electrically coupled to the stationary power grid. The vehicle system includes where the driveline electrical losses are based on electrical power input to the motor, motor speed, and motor torque. The vehicle system further comprises additional instructions to revise a speed the engine operates at based on a desired wheel torque and the updated engine mechanical losses.

Referring now to FIG. 4, a block diagram for determining engine and motor/generator desired operating conditions is shown. The block diagram of FIG. 4 may be incorporated as executable instructions into non-transitory memory of the controller shown in FIGS. 1-3.

A position of accelerator pedal 134 and wheel speed from wheels 216 is converted to a driver demand torque via a transfer function at block 402. The driver demand torque and the vehicle speed are multiplied in block 406 to provide a desired or requested wheel power. The desired or requested wheel power is the basis for determining a transmission input power (e.g., a torque converter impeller power). The wheel power is transformed into the torque converter impeller power by multiplying the wheel power by the engaged gear ratio and a torque converter transfer function, if the hybrid driveline includes a step ratio transmission and torque converter. If the hybrid driveline includes a fixed gear set, the desired wheel power is multiplied by the ratio of the fixed gear set to determine the desired transmission input power.

At block 410, it is determined how much of the desired transmission input shaft power is to be provided by the engine and how much of the desired transmission input shaft power is to be provided by the motor or generator. In one example, the battery state of charge, battery discharge limits, vehicle speed, and desired transmission input power are input to power arbitration algorithm and engine power and motor/generator power are output. The desired engine power is input to block 412 where the engine and motor speeds are determined. The engine power is used to index a table or function of empirically determined engine speed values along with present vehicle speed and engaged transmission gear ratio. The table or function outputs a desired engine speed. The desired engine speed is also the desired motor/generator speed if the engine and motor/generator are selectively coupled, or if the engine and motor/generator rotate at a same speed. The motor/generator speed may be multiplied by a gear ratio if there is a gear set between the engine and the motor/generator.

The engine speed and motor/generator speed are input to block 414 with the desired engine power and the desired motor/generator power where engine torque and motor/generator torque are determined. In one example, the desired engine power is divided by the engine speed determined at block 412 to provide the desired engine torque. The desired engine torque at the desired engine speed provides the desired engine power. Similarly, the desired motor/generator power is divided by the motor/generator speed determined at block 412 to provide the desired motor/generator torque. The desired motor/generator torque at the desired motor/generator speed provides the desired motor/generator power. The desired engine speed and torque along with the desired motor/generator speed and torque are input to block 416.

At block 416, engine torque actuators such as a throttle, fuel injectors, and cam timing are adjusted to operate the engine at the desired speed and torque. Current supplied to or generated by the motor/generator is adjusted to operate the motor/generator at the desired motor/generator speed and torque.

Figure 5A:
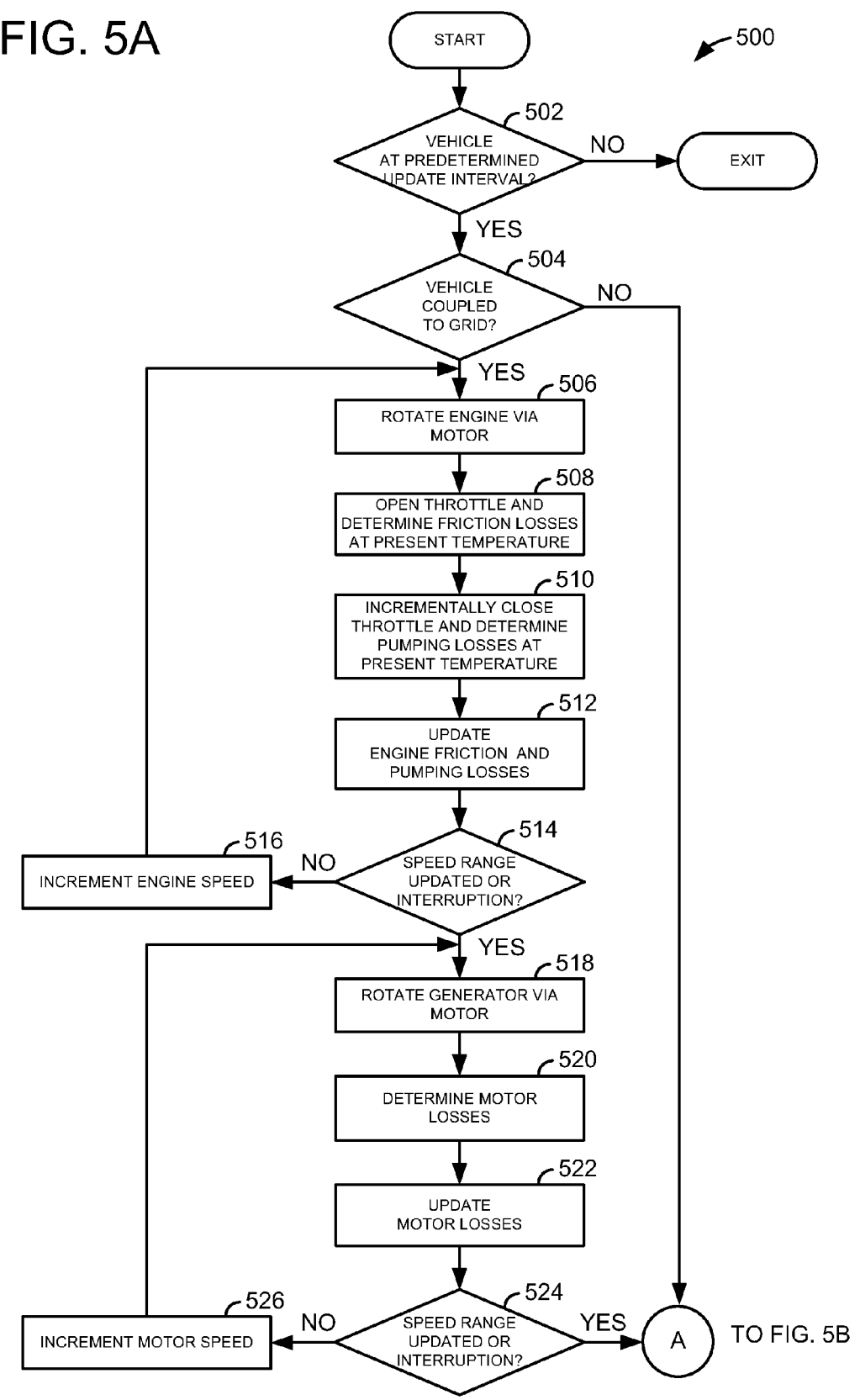
FIGS. 5A-5C show an example method for revising desired engine and motor/generator operating conditions.
Figure 5B:
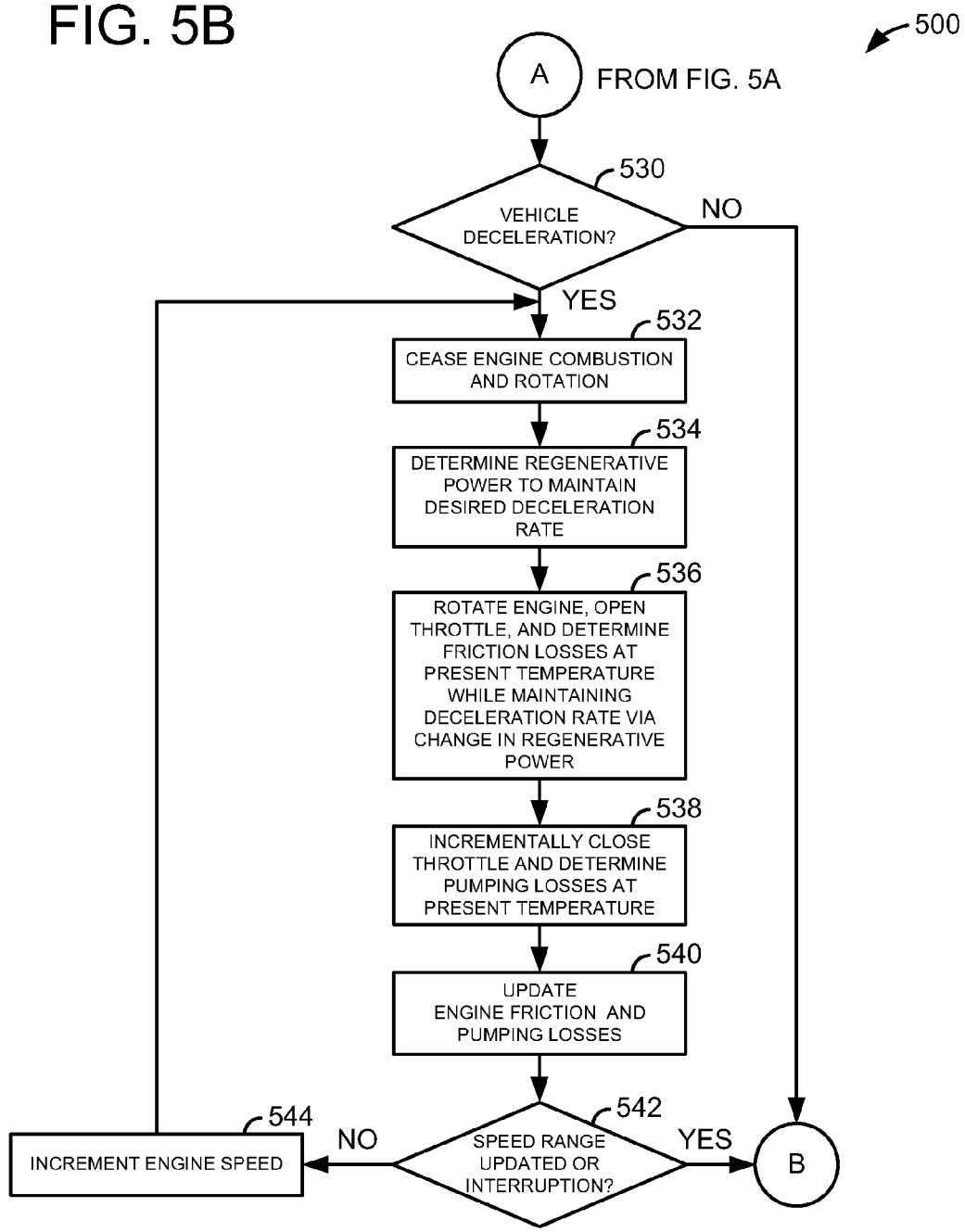
Figure 5C:
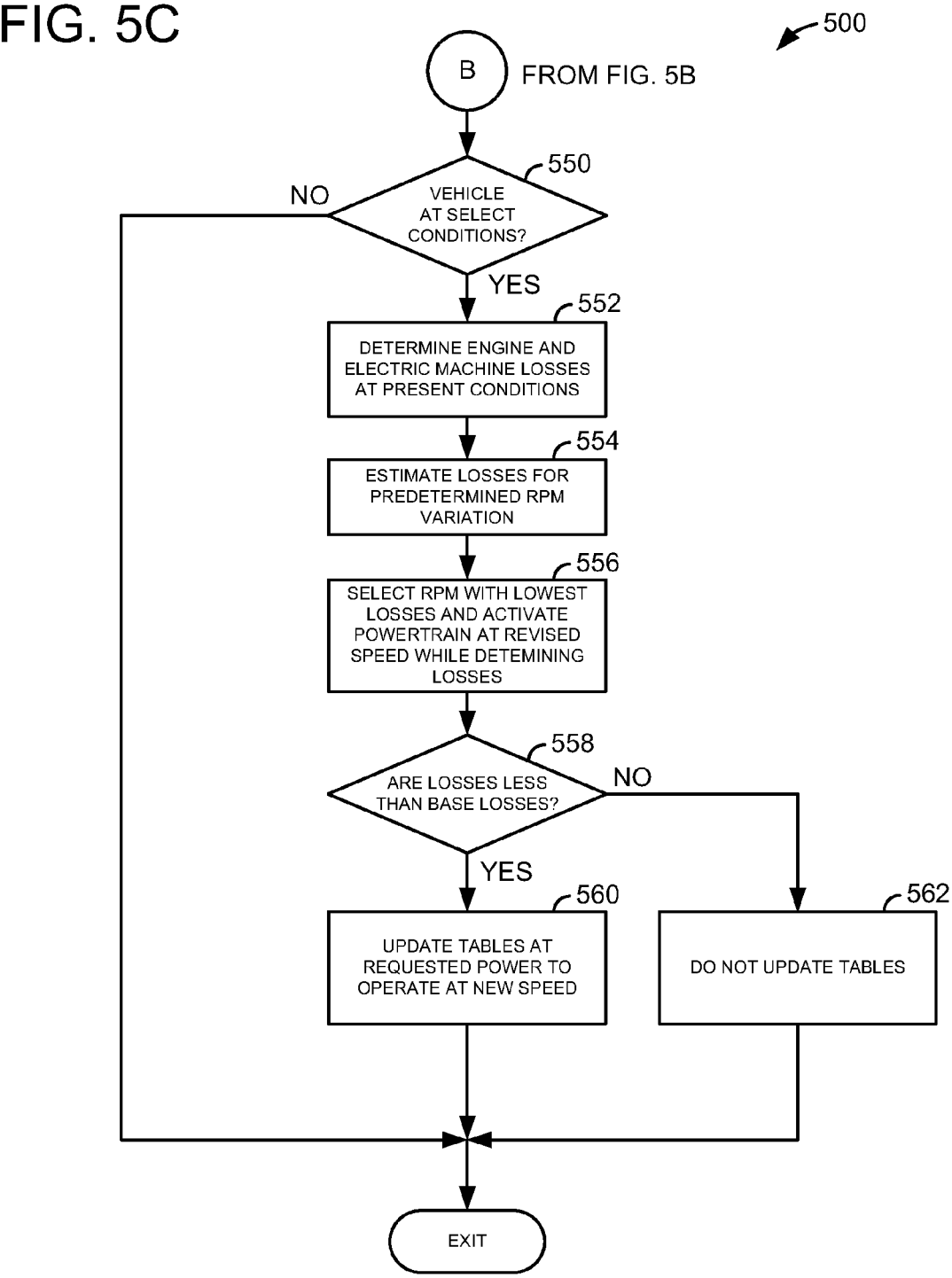

Referring now to FIGS. 5A-5C, an example method for revising desired engine and motor/generator operating conditions is shown. The method of FIGS. 5A-5C may be included in the systems of FIGS. 1-3 as instructions stored in non-transitory memory.

At 502, method 500 judges if the vehicle is at or exceeding a predetermined parameter update interval. The predetermined update interval may be a distance traveled, a time the vehicle is in operation, or an indication that engine emissions are degrading. Engine emission degradation may be determined via an adaptive air-fuel ratio parameter or via a sensor. If method 500 judges that the vehicle or driveline is at or exceeding the predetermined interval, the answer is yes and method 500 proceeds to 504. Otherwise, the answer is no and method 500 proceeds to exit.

At 504, method 500 judges if the vehicle is electrically coupled to a stationary electrical grid. The vehicle may be coupled to a stationary electrical power grid at a home or a charging station. In one example, method 500 may judge that the vehicle is electrically coupled to a stationary electrical power grid based on a voltage at an electrical input to the vehicle or via a position of a switch. If method 500 judges that the vehicle is electrically coupled to a stationary electrical power grid, the answer is yes and method 500 proceeds to 506. Otherwise, the answer is no and method 500 proceeds to 530.

At 506, method 500 rotates the engine via a motor in the driveline without providing fuel or spark to the engine. In one example, method 500 begins rotating the engine at a base idle speed (e.g., 600 RPM). Method 500 also determines the present engine temperature and stores the temperature to memory. The vehicle transmission is in park for methods used to update engine and motor/generator losses. Method 500 proceeds to 508 after the engine begins to rotate.

At 508, method 500 opens the engine's throttle as the engine rotates at the engine idle speed. The current supplied to the motor to rotate the engine at the engine idle speed is converted into a torque. The torque value represents engine friction torque for the present engine temperature and engine speed. Method 500 proceeds to 510 after the engine friction losses are determined.

At 510, method 500 incrementally closes the throttle. The engine friction torque determined at 508 is subtracted from the torque to rotate the engine at each incremental closing position of the throttle. The resulting values are recorded to memory and the resulting values represent engine pumping losses for the engine at the present engine speed and throttle position. Method 500 proceeds to 512.

At 512, method 500 updates engine friction and pumping losses in memory with the engine friction value and engine pumping losses determined at 508 and 510. The engine friction value and the engine pumping losses are installed in tables or functions that store a plurality of engine friction losses and pumping losses for a plurality of engine speeds and throttle positions at each speed of the plurality of engine speeds. The engine friction and pumping losses are used to determine engine losses. Method 500 proceeds to 514 after the engine friction and engine pumping losses in the tables are updated.

At 514, method 500 judges if judges if engine friction and engine pumping losses for a predetermined engine speed range have been updated or if there is an interruption to cease updating the engine friction losses and engine pumping losses. An interruption may be a condition of decoupling the vehicle from the stationary electrical grid or a request by a driver to operate the vehicle. In some examples, method 500 updates engine friction and engine pumping losses for a predetermined engine speed range (e.g., 600-2500 RPM). If method 500 judges that the engine friction and pumping losses have been updated for the predetermined engine speed range or there is an interruption, the answer is yes and method 500 proceeds to 518. Otherwise, the answer is no and method 500 proceeds to 516.

At 516, method 500 increments the present engine speed by a predetermined amount. For example, method 500 may increment engine speed from 600 RPM to 800 RPM. Method 500 returns to 506 after the engine speed is incremented.

At 518, method 500 rotates the generator via the motor for systems such as the system of FIG. 3. The generator operates as a load to the motor so that motor losses may be determined over a plurality of motor speeds and torque conditions. If only a single motor is in the driveline as is shown in FIG. 2, the motor may rotate the engine to provide a load to the motor.

The vehicle transmission is in park. The motor may be rotated at a predetermined speed to begin determining motor losses. Method 500 proceeds to 520 after the motor begins rotating.

At 520, method 500 determines motor losses. In one example, the amount of current supplied to the motor is multiplied by the voltage supplied to the motor to determine the motor input power. The output power of the motor is determined by multiplying the motor torque by the motor speed. Motor output torque and speed may be inferred or measured via sensors. The motor losses may be determined by subtracting the motor output power from the motor input power. In other examples, current and voltage supplied to an inverter supplying electrical power is determined and motor output is subtracted to determine losses for the motor and the inverter. The motor power output may be incremented a plurality of times at a present motor speed to determine motor power losses over a power range.

Similarly, the generator may be operated as a motor to determine generator losses. Further still, losses for the motor/generator in generator mode may be determined via subtracting electrical power output from the generator (e.g., current multiplied by voltage) from mechanical power input to the generator (e.g., torque supplied to the generator multiplied by generator speed). Method 500 proceeds to 522 after determining motor/generator power losses. The generator input power may be incremented a plurality of times at a present generator speed to determine generator losses over a power range.

At 522, method 500 updates motor losses and generator losses in memory with motor and generator losses determined at 522. The motor and generator losses are installed in tables or functions that store a plurality of motor and generator losses for a plurality of motor and generator power input and output levels at the present motor/generator speed. Method 500 proceeds to 524 after the motor power losses in the tables are updated.

At 524, method 500 judges if motor/generator losses for a predetermined speed range have been updated or if there is an interruption to cease updating the motor/generator losses. An interruption may be a condition of decoupling the vehicle from the stationary electrical grid or a request by a driver to operate the vehicle. In some examples, method 500 updates motor/generator losses for a predetermined motor/generator speed range (e.g., 0-2500 RPM). If method 500 judges that the motor/generator losses have been updated for the predetermined motor/generator speed range or there is an interruption, the answer is yes and method 500 proceeds to 530. Otherwise, the answer is no and method 500 proceeds to 526.

At 526, method 500 increments the present motor/generator speed by a predetermined amount. For example, method 500 may increment motor speed from 200 RPM to 500 RPM. Method 500 returns to 518 after the motor/generator speed is incremented.

At 530, method 500 judges if the vehicle is decelerating. Further, method 500 may require that driver demand is less than a threshold driver demand torque. If method 500 judges that the vehicle is decelerating and driver demand is less than a threshold driver demand, the answer is yes and method 500 proceeds to 532. Otherwise, the answer is no and method 500 proceeds to 550.

At 532, method 500 ceases engine combustion and engine rotation for determining engine friction and pumping losses. Engine combustion may be ceased via stopping fuel flow and spark to the engine. Stopping the engine allows the generator regeneration power to decelerate the vehicle to be determined without including power to rotate the engine. Method 500 proceeds to 534 after engine combustion ceases.

At 534, method 500 determines an amount of regenerative power (e.g., power converted to electrical energy) to maintain vehicle deceleration at a desired rate. In one example, a table of empirically determined regeneration power levels is indexed by vehicle speed, estimated road grade, and engaged transmission gear. The table outputs regeneration power (e.g., negative power applied to the driveline) in response to the present vehicle speed, estimated road grade, and engaged transmission gear. The generator is commanded to the desired regeneration power and the vehicle deceleration rate is determined. If the vehicle deceleration rate is greater than desired, the regeneration power is reduced. If the vehicle deceleration rate is less than desired, the regeneration power is increased. Method 500 proceeds to 536 after the regeneration power level is determined.

At 536, method 500 rotates the engine and opens the engine throttle to reduce engine pumping losses. The regeneration power is adjusted to maintain the vehicle deceleration rate. The change in regeneration power is estimated as the engine friction losses. For example, if the vehicle is decelerating at a desired rate using X KW of regeneration power without rotating the engine, and the vehicle decelerates at the desired rate using eighty percent of X KW while rotating the engine, the engine friction power loss is estimated as twenty percent of X KW. Method 500 proceeds to 538 after the engine friction power loss is determined.

At 538, method 500 incrementally closes the engine throttle a plurality of times to determine engine pumping losses. The engine pumping losses are determined by partially closing the engine throttle and adjusting the regeneration power to maintain a same rate of vehicle deceleration at each of a plurality of throttle positions. The regeneration power while rotating the engine with an open throttle is subtracted from the regeneration power used to maintain the vehicle deceleration rate while rotating the engine at the partially closed throttle position to determine the estimate of engine pumping losses for the present engine speed and throttle position. The same procedure is repeated at the plurality of throttle positions to determine engine pumping losses over a range of throttle positions. Method 500 proceeds to 540 after engine pumping losses for the present engine speed and plurality of throttle positions are determined.

At 540, method 500 updates engine friction value and pumping losses in memory with the engine friction value and engine pumping losses determined at 536 and 538. The engine friction value and the engine pumping losses are installed in tables or functions that store a plurality of engine friction losses and pumping losses for a plurality of engine speeds and throttle positions at each speed of the plurality of engine speeds. The engine friction and pumping losses are used to determine engine losses. Method 500 proceeds to 542 after the engine friction and engine pumping losses in the tables are updated.

At 542, method 500 judges if judges if engine friction and engine pumping losses for a predetermined engine speed range have been updated or if there is an interruption to cease updating the engine friction losses and engine pumping losses. An interruption may be a condition of decoupling the vehicle from the stationary electrical grid or a request by a driver to operate the vehicle. In some examples, method 500 updates engine friction and engine pumping losses for a predetermined engine speed range (e.g., 600-3500 RPM). If method 500 judges that the engine friction and pumping losses have been updated for the predetermined engine speed range or there is an interruption, the answer is yes and method 500 proceeds to 550. Otherwise, the answer is no and method 500 proceeds to 544.

At 544, method 500 increments the present engine speed by a predetermined amount. For example, method 500 may increment engine speed from 600 RPM to 800 RPM. Method 500 returns to 532 after the engine speed is incremented.

It should be noted that if method 500 revised engine, motor, and generator losses during vehicle deceleration or while coupled to an electrical grid, a variable in memory may forced to a state to indicate updating losses is not to be performed until select conditions occur (e.g., the vehicle travels a predetermined distance or operates for a predetermined amount of time). Further, the engine loss tables or functions described at 508-512 are the same engine loss tables described at 534-540.

At 550, method 500 judges if the vehicle is operating at select conditions. In one example, the vehicle may be operating at a constant speed and requested power. If method 500 judges that the vehicle is operating at select conditions, the answer is yes and method 500 proceeds to 552. Otherwise, the answer is no and method 500 proceeds to exit.

At 552, method 500 determines engine, motor, and generator losses at the present (e.g., base) engine speed, motor speed, and generator speed. If the driveline only includes an engine and a motor/generator as shown in FIG. 2, method 500 determines engine and motor losses.

The generator losses may be determined via indexing functions described at 518-522 based on the present generator speed, generator output, and generator temperature. Similarly, the motor losses may be determined via indexing functions described at 518-522 based on the present motor speed, motor output torque, and motor temperature. Additionally, voltage controller (e.g. a voltage controller supplying electrical power to the motor) losses may be added to motor and generator losses to determine driveline electrical losses, and voltage controller losses may be determined by indexing a table or function of empirically determined voltage controller losses via voltage controller input voltage and inductor temperature.

Engine losses (e.g., pumping and friction) may be determined via indexing functions as described at 508-512 and 534-540 based on engine speed and throttle position. Further, engine losses may also include losses for spark timing. Spark timing losses may be determined by multiplying a spark torque ratio (e.g., torque at present spark timing divided by torque at minimum spark timing for best torque (MBT)) by indicated engine torque (e.g., based on engine speed and load) and by engine speed. The engine losses are added to the electrical system losses to determine the driveline losses. Method 500 proceeds to 554 after the driveline losses are determined.

At 554, method 500 estimates driveline losses for the motor, generator, voltage controller and engine at the present engine, motor, and generator speeds plus a predetermined RPM increase (e.g., between 25 and 300 RPM). For example, if the present engine speed is 800 RPM engine losses at 825 RPM are determined. Additionally, driveline losses for the motor, generator, voltage controller and engine at the present engine, motor, and generator speeds minus a predetermined RPM decrease (e.g., between 25 and 300 RPM) are determined. It should also be noted that the speed increase and decrease may be different for step ratio transmissions than it is for continuously variable transmissions. The engine, motor, and generator losses are determined via indexing the previously mentioned tables and functions using the higher or lower engine, motor, and generator speeds. The engine losses at the increased and decreased engine speeds are added to the motor and generator losses to determine driveline losses at speeds increased and decreased from the speeds the engine, motor, and generator presently are operating. Method 500 proceeds to 556 after engine, motor, and generator losses at speeds greater than and less than the present speed are determined.

At 556, method 500 selects a speed based on driveline losses at the present speed, the lower speed, and the higher speed. In one example, for each speed, method 500 subtracts the driveline losses from the total driveline input power and divides the result by the total driveline input power to determine the efficiency. Method 500 then selects the speed where the driveline efficiency is highest.

Method 500 operates the engine, motor, and generator at the selected speed for a predetermined amount of time and determines the engine losses, motor losses, and generator losses by indexing the tables and functions described at 552. Method 500 proceeds to 558 after the driveline losses are determined at the new speed.

At 558, method 500 judges if the driveline losses are less than the losses at the base speed. Additionally, method 500 judges if the driveline is operating stable at the new speed. The engine may be determined to be operating stable if the engine is not knocking, detonating, or lugging. If the driveline losses at the new speed are less than at the base speed, the answer is yes and method 500 proceeds to 560. Otherwise, the answer is no and method 500 proceeds to 562.

At 560, method 500 revises the tables or functions stored in memory and described at 412 to adjust the engine, motor, and generator speeds based on the presently requested wheel power. In particular, the speed values in a table or function are revised with the speed value determined at 558. Once the revised speed value is updated, engine torque actuators, current and voltage supplied to the motor, and load supplied to the generator are adjusted based on the revised speed values to provide the desired wheel power. Method 500 proceeds to exit after the revised speed value is updated.

At 562, method 500 does not update the tables and functions described at 412 since the change in speed does not provide a higher level of efficiency.

Thus, method 500 provides for updating engine losses, motor losses, and generator losses over a powertrain operating domain (e.g., power output and speed extents) during different circumstances that reduce the possibility of disturbing a driver. By revising the losses, the driveline may be operated at more efficient operating conditions. Further, method 500 revises the speed that the engine, motor, and generator operate at to provide a desired wheel torque. By revising the speed that the engine, motor, and generator operate, it may be possible to operate the driveline more efficiently. Further, as driver demand increases and decreases, the desired engine, motor, and generator speeds and losses may be revised and updated as method 500 repeatedly executes at the different requested wheel torque levels.

The method of FIGS. 5A-5C provides for a method, comprising: comparing engine efficiency at a present engine speed to engine efficiency at adjacent high and low engine speed values over a domain of a first function to find a maximum driveline efficiency based on driveline electrical losses and mechanical losses; and adjusting engine and motor speed settings responsive to the comparison. The method includes where driveline mechanical losses include engine pumping losses and engine friction losses. The method further comprises updating values of engine pumping losses and engine friction losses in response to electrically coupling a vehicle to a stationary power grid.

In some examples, the method further comprises updating values of engine pumping losses and engine friction losses in response to a vehicle decelerating. The method further comprises comparing motor efficiency at a present motor speed to motor efficiency at adjacent high and low motor speed values over a domain of a second function to find the maximum driveline efficiency. The method further comprises comparing voltage controller efficiency at the present motor speed to voltage controller efficiency at adjacent high and low motor speed values over a domain of a third function to find the maximum driveline efficiency. The method also further comprises updating the driveline mechanical losses via rotating an engine via a motor.

The method of FIGS. 5A-5C also provides for rotating an engine and generator in response to vehicle deceleration and a request to update engine mechanical losses; updating engine friction and pumping losses in response to the request to update engine mechanical losses; and operating the engine in response to the updated engine friction and pumping losses. The method includes where engine spark and fuel supplied to the motor are deactivated when rotating the engine. The method further comprises comparing engine efficiency at a present engine speed and engine efficiency at adjacent high and low engine speed values over a domain of a function to find a maximum driveline efficiency based on the updated engine friction and pumping losses.

In some examples, the method further comprises adjusting generator output to maintain a desired vehicle deceleration rate while determining engine friction and pumping losses. The method further comprises fully opening an engine throttle in response to the request to update engine mechanical losses. The method further comprises incrementally closing the fully opened throttle to determine engine pumping losses. The method further comprises updating a speed the engine rotates in response to a desired wheel power based on the updated engine mechanical losses.

As will be appreciated by one of ordinary skill in the art, the methods described in FIGS. 5A-5C may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
    comparing engine efficiency at a present engine speed to engine efficiency at adjacent high and low engine speed values over a domain of a first function to find a maximum driveline efficiency based on driveline electrical losses and mechanical losses;
    adjusting engine and motor speed settings responsive to the comparison; and
    adjusting one or more engine torque actuators and/or motor current based on the adjusted engine and motor speed settings.

2. The method of claim 1, where driveline mechanical losses include engine pumping losses and engine friction losses.

3. The method of claim 2, further comprising updating values of engine pumping losses and engine friction losses in response to electrically coupling a vehicle to a stationary power grid.

4. The method of claim 2, further comprising updating values of engine pumping losses and engine friction losses in response to a vehicle decelerating.

5. The method of claim 1, further comprising comparing motor efficiency at a present motor speed to motor efficiency at adjacent high and low motor speed values over a domain of a second function to find the maximum driveline efficiency.

6. The method of claim 5, further comprising comparing voltage controller efficiency at the present motor speed to voltage controller efficiency at adjacent high and low motor speed values over a domain of a third function to find the maximum driveline efficiency.

7. The method of claim 1, further comprising updating the driveline mechanical losses via rotating an engine via a motor.

8. A method, comprising:
    rotating an engine and a generator via an electronic controller in response to vehicle deceleration and a request to update engine mechanical losses;
    updating engine friction and pumping losses stored in a memory of the electronic controller in response to the request to update engine mechanical losses; and
    operating the engine via the electronic controller in response to the updated engine friction and pumping losses.

9. The method of claim 8, where engine spark and fuel supplied to the motor are deactivated when rotating the engine.

10. The method of claim 8, further comprising comparing engine efficiency at a present engine speed and engine efficiency at adjacent high and low engine speed values over a domain of a function to find a maximum driveline efficiency based on the updated engine friction and pumping losses.

11. The method of claim 8, further comprising adjusting generator output to maintain a desired vehicle deceleration rate while determining engine friction and pumping losses.

12. The method of claim 11, further comprising fully opening an engine throttle in response to the request to update engine mechanical losses.

13. The method of claim 12, further comprising incrementally closing the fully opened throttle to determine engine pumping losses.

14. The method of claim 8, further comprising updating a speed the engine rotates in response to a desired wheel power based on the updated engine mechanical losses.

15. A vehicle system, comprising:
    an engine;
    a motor/generator in mechanical communication with the engine; and
    a controller including non-transitory instructions executable to rotate the engine via the motor/generator in response to a request to update engine mechanical losses and a vehicle in which the motor/generator operates being electrically coupled to a stationary power grid.

16. The vehicle system of claim 15, further comprising additional instructions to update the engine mechanical losses stored in memory in response to the vehicle decelerating.

17. The vehicle system of claim 16, where the engine mechanical losses include friction and pumping losses, and further instructions to update driveline electrical losses.

18. The vehicle system of claim 15, further comprising additional instructions to update motor losses stored in memory in response to a request to update driveline electrical losses and the vehicle being electrically coupled to the stationary power grid.

19. The vehicle system of claim 18, where the driveline electrical losses are based on electrical power input to the motor, motor speed, and motor torque.

20. The vehicle system of claim 15, further comprising additional instructions to revise a speed the engine operates at based on a desired wheel torque and the updated engine mechanical losses.

* * * * *